United States Patent
Amirsoleymani et al.

(10) Patent No.: US 10,929,370 B2
(45) Date of Patent: Feb. 23, 2021

(54) INDEX MAINTENANCE MANAGEMENT OF A RELATIONAL DATABASE MANAGEMENT SYSTEM

(71) Applicant: International Business Machines Corporation, Armonk, NY (US)

(72) Inventors: Saghi Amirsoleymani, Mountain View, CA (US); John J. Campbell, Alton (GB); Andrei F. Lurie, San Jose, CA (US); Terence P. Purcell, Springfield, IL (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 15/099,577

(22) Filed: Apr. 14, 2016

(65) Prior Publication Data
US 2017/0300517 A1     Oct. 19, 2017

(51) Int. Cl.
*G06F 16/22*     (2019.01)

(52) U.S. Cl.
CPC ................. *G06F 16/2272* (2019.01)

(58) Field of Classification Search
CPC ......... G06F 17/30336; G06F 17/30091; G06F 17/30321; G06F 17/30864; G06F 17/3033
USPC ....................................................... 707/696
See application file for complete search history.

(56) References Cited

U.S. PATENT DOCUMENTS

| 6,591,269 | B1 | 7/2003 | Ponnekanti | |
|---|---|---|---|---|
| 7,945,543 | B2 | 5/2011 | Kennedy et al. | |
| 8,140,495 | B2 | 3/2012 | Carlin et al. | |
| 8,566,300 | B2 * | 10/2013 | Murthy | G06F 17/2205 707/705 |
| 2010/0250504 | A1 * | 9/2010 | Balasubramanian | G06F 16/217 707/696 |
| 2010/0318519 | A1 * | 12/2010 | Hadjieleftheriou | G06F 16/328 707/742 |
| 2012/0016851 | A1 * | 1/2012 | Hrle et al. | 707/696 |
| 2012/0016881 | A1 * | 1/2012 | Hrle | G06F 17/30312 707/746 |
| 2013/0018890 | A1 * | 1/2013 | Rajan | G06F 17/30336 707/741 |
| 2013/0254212 | A1 * | 9/2013 | Rao | G06F 16/322 707/746 |
| 2014/0258251 | A1 * | 9/2014 | Bestgen | G06F 17/30442 707/696 |
| 2014/0280193 | A1 * | 9/2014 | Cronin | G06F 17/30539 707/741 |
| 2015/0278327 | A1 * | 10/2015 | Raghavan | G06F 9/466 707/615 |

* cited by examiner

*Primary Examiner* — Hosain T Alam
*Assistant Examiner* — Nicholas E Allen
(74) *Attorney, Agent, or Firm* — Erik K. Johnson

(57) ABSTRACT

Disclosed aspects relate to index maintenance management of a relational database management system having a set of indexes. A subset of the set of indexes, which is indicated as a non-critical index subset, is detected with respect to the set of indexes. Related to maintenance of the subset of the set of indexes, a determination is made to perform an index maintenance impact action. Corresponding to the subset of the set of indexes, the index maintenance impact action is performed.

20 Claims, 6 Drawing Sheets

INDEX MAINTENANCE MANAGEMENT OF A RELATIONAL DATABASE MANAGEMENT SYSTEM

BACKGROUND

This disclosure relates generally to database management systems and, more particularly, relates to index maintenance management. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to efficiencies with respect to the performance impact of non-critical indexes. Various options may be performed with respect to the non-critical indexes. The non-critical indexes may be, first, hidden from the query optimizer. The non-critical indexes may be, second, selected as deferred insert candidates such that the application will not wait for the insert to complete for the non-critical indexes. The non-critical indexes may, third, have input data removed from the non-critical indexes and keep only an index definition in a catalog. The non-critical indexes may, fourth, drop the non-critical indexes. Aspects described herein may assess the impact and reduce the risk of dropping indexes that are deemed as non-critical to current application processes.

Aspects of the disclosure relate to index maintenance management of a relational database management system having a set of indexes. A subset of the set of indexes, which is indicated as a non-critical index subset, is detected with respect to the set of indexes. Related to maintenance of the subset of the set of indexes, a determination is made to perform an index maintenance impact action. Corresponding to the subset of the set of indexes, the index maintenance impact action is performed.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
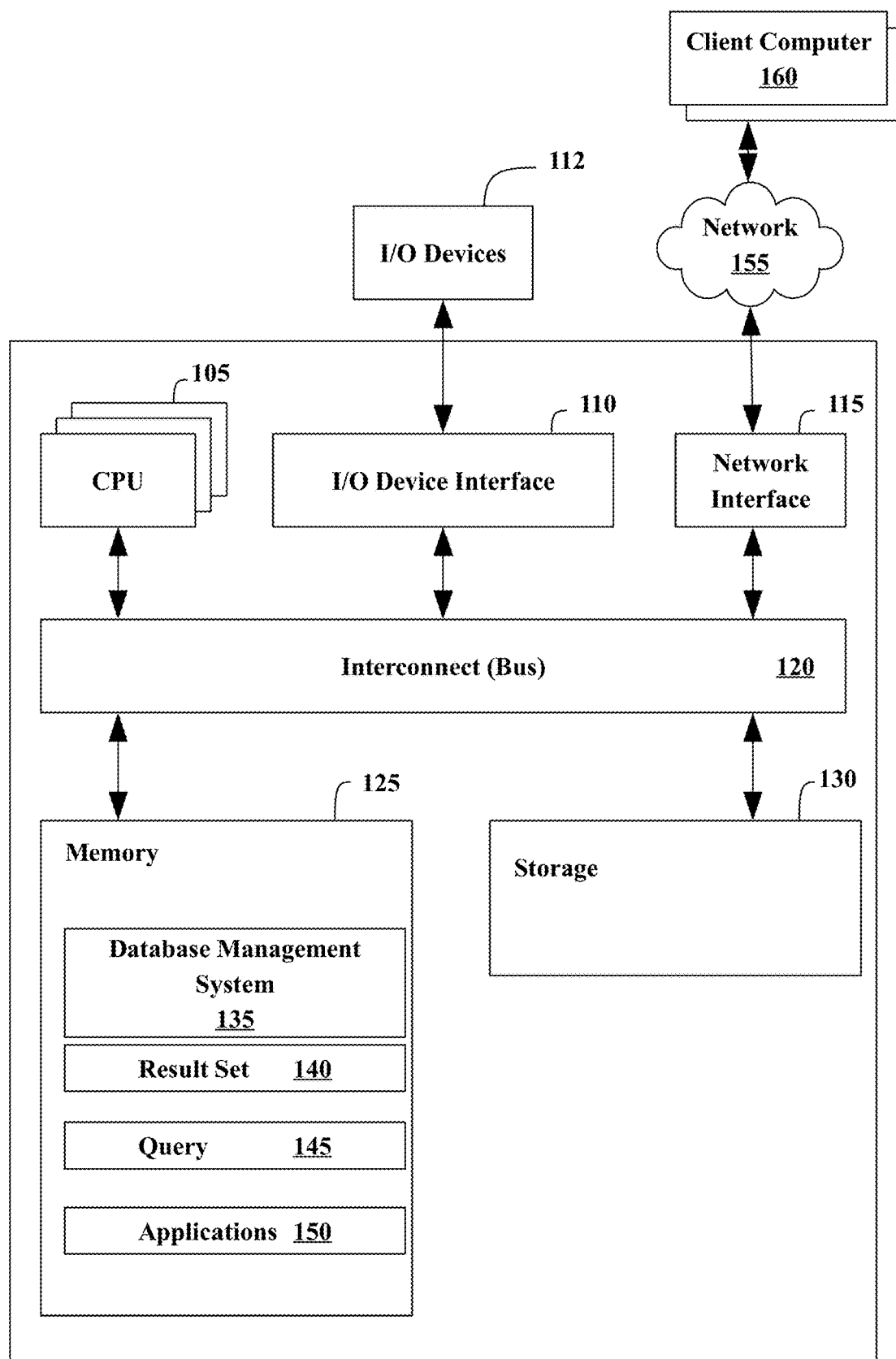
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to reducing the performance impact of non-critical indexes. Various options may be performed with respect to the non-critical indexes. The non-critical indexes may be, first, hidden from the query optimizer. The non-critical indexes may be, second, selected as deferred insert candidates such that the application will not wait for the insert to complete for the non-critical indexes. The non-critical indexes may, third, have input data removed from the non-critical indexes and keep only an index definition in a catalog. The non-critical indexes may, fourth, drop the non-critical indexes. Aspects described herein may assess the impact and reduce the risk of dropping indexes that are deemed as non-critical to current application processes.

The performance of insert into a relational database table can degrade as more indexes are added to that table, since the insert is added to each index. The same is true for updates and deletes, however, insert performance may have more performance impact. Indexes are generally added to support uniqueness constraints and for improved performance of data retrieval. Additional indexes are common from the initial deployment of an application or over time as new indexes are added to address individual performance issues. Usage patterns of the application or the introduction of other tuning solutions such as materialized query tables (MQTs), a column store data structure, or an accelerator may change the requirements for existing indexes.

Applications deployed using rapid development methodologies may be tested in low volume environments, and if deployed to small/medium sized environments, performance challenges may not be identified. Such applications may deliver a large number of indexes to support all available features of an application, although the customer may only use a portion of those features. Dropping unused indexes may improve insert (update/delete) performance, but there is risk associated with using historical usage information to drop an index. If an index is needed intermittently, such as for a month-end report or process, then it may be desired to retain the index. Dropping an index that is found to be needed may cause a significant degradation in performance for that process, and may require an application outage if the index must be rebuilt. For various applications, there may be a future need for certain indexes if additional features of the application are utilized. Supplementing a row store table with a column store or adding an accelerator to the database can reduce the need for indexes on the row store table that were used for queries that are now processed against the column store or accelerator.

Aspects described herein can identify which indexes are critical such that they can/cannot be candidates for an index maintenance management action. Indexes identified as non-critical to the application may be candidates for the index maintenance management action. In embodiments, insert performance may be improved because only the inserts to critical indexes would be synchronous. Indexes can remain in a deferred state indefinitely to allow them to be brought back online into an active (non-deferred) state in a streamlined (and automated) fashion. In certain embodiments (e.g., as a progression after deferred status), input data may be removed from the index such that only the definition remains for historical tracking. An index in a definition-only state can be hidden from the query optimizer such that it is not considered for access path selection.

Indexes may be brought from asynchronous to synchronous (e.g., regular insert) status. Switching indexes between an asynchronous and synchronous status (and vice versa) may be scheduled based upon application processes manually or automatically. Switching a definition-only index back to an active state can require the index to be rebuilt, which may be desirable in cases where an index is used infrequently and the rebuild could be scheduled before the application would require the index. Once a satisfactory time period has passed and an index has been in a deferred or definition-only status without active use, the index can be dropped completely if there is no expectation that there will be future usage.

Aspects of the disclosure include a method, system, and computer program product for index maintenance management of a relational database management system having a set of indexes with respect to a relational database table. A subset of the set of indexes, which is indicated as a non-critical index subset, is detected with respect to the set of indexes. Related to maintenance of the subset of the set of indexes, a determination is made to perform an index maintenance impact action. Corresponding to the subset of the set of indexes, the index maintenance impact action is performed. Using index maintenance management, aspects of the disclosure may provide performance or efficiency benefits (e.g., speed, flexibility, responsiveness, resource usage, productivity). The query optimizer of the relational database management system may benefit from index maintenance management without requiring manual intervention. Administrators/users of the database management system can use their time on matters other than managing indexes (e.g., rather than sifting through large data stores of infrequently used information). Aspects may save resources such as bandwidth, processing, or memory.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
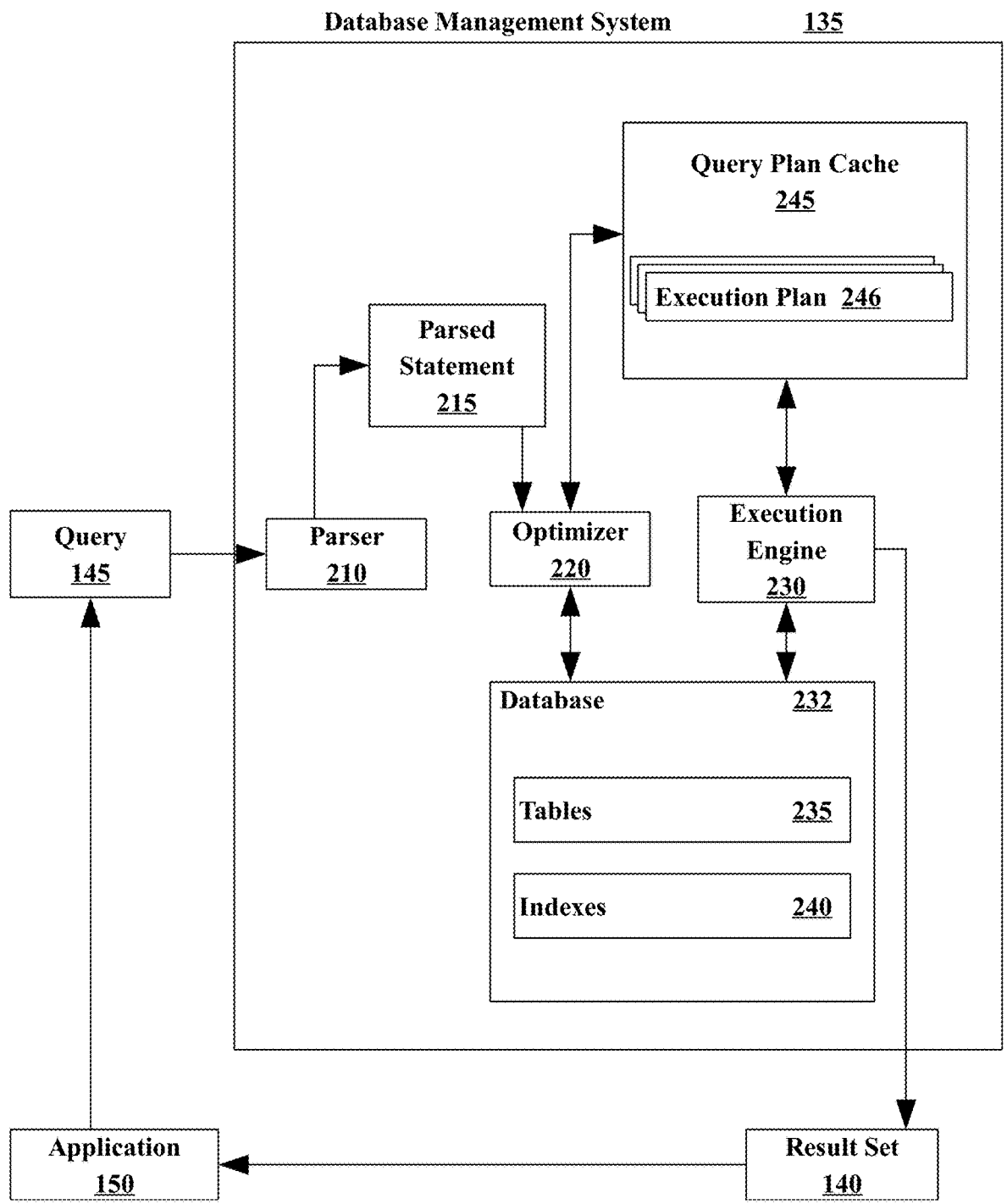
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
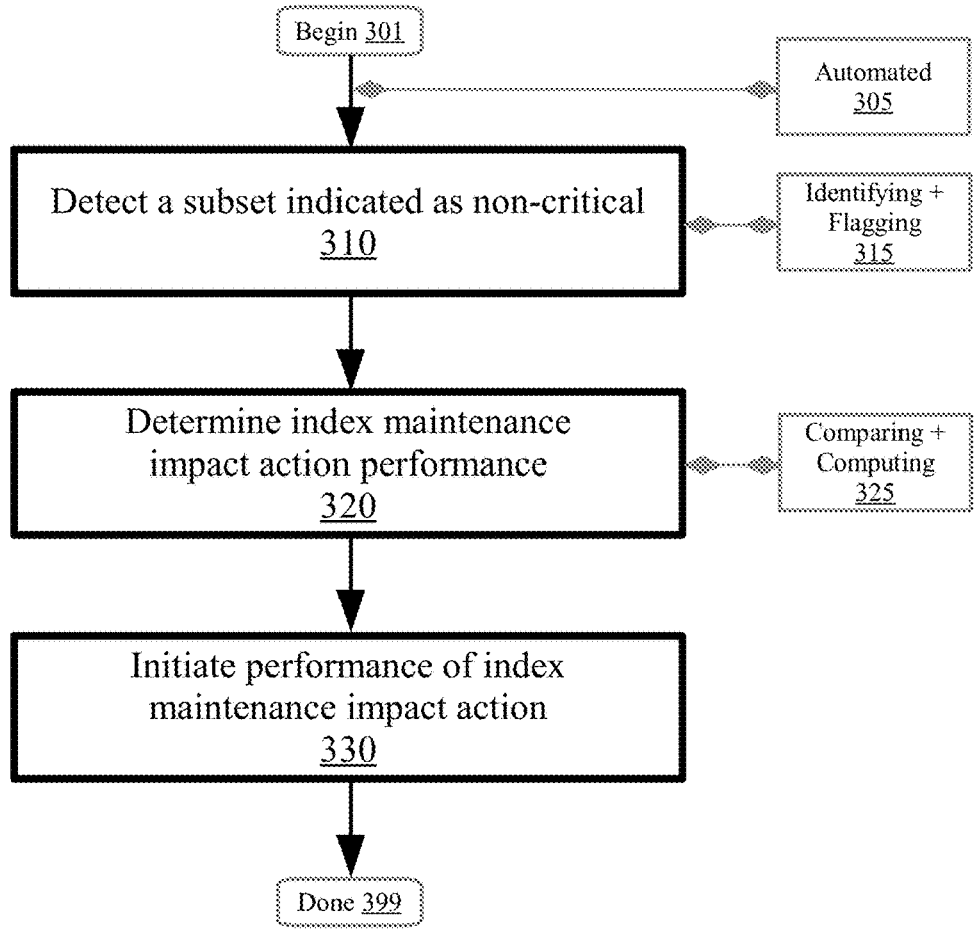
FIG. 3 is a flowchart illustrating a method for index maintenance management according to embodiments.

FIG. 3 is a flowchart illustrating a method 300 for index maintenance management of a relational database management system (RDBMS) according to embodiments. The relational database management system has a set of indexes with respect to a relational database table. Aspects described herein may be useful at object creation time (e.g., initial creation of the index) or at plan selection time (e.g., in response to a query). Method 300 may begin at block 301. In embodiments, operational steps described herein (e.g., the detecting, the determining, the performing) each occur in an automated fashion without user intervention at block 305.

At block 310, a subset of the set of indexes, which is indicated as a non-critical index subset, is detected with respect to the set of indexes. The subset of the set of indexes can include at least one non-critical, superfluous, redundant, or otherwise extra index that is at least a portion of the set of indexes (e.g., an index accessed no more than once per time period such as monthly/quarterly). Detecting can include sensing, observing, or analyzing, and may utilize various identification techniques as described herein (e.g., an inclusion/exclusion methodology whereby indexes are excluded from being candidates for inclusion with respect to the index maintenance impact action).

In embodiments, the detecting operational step includes identifying and flagging the subset of the set of indexes at block 315. The RDBMS may identify indexes of the set of indexes that are and are not candidates to be considered for an index maintenance impact action. Such identification may include an exclusion process based upon identifying indexes that are critical to technical/business/scientific processes/tasks/applications and thus should rarely (if ever) be considered for the index maintenance impact action. To benefit resource usage, the subset of the set of indexes may be identified (automatically) based on a selection from a group consisting of at least one of: a uniqueness factor, a clustering factor, an application usage factor, or a user-provided factor.

Indexes may be identified (e.g., chosen/selected, included/excluded) based on uniqueness. Indexes meeting/not-meeting the uniqueness factor/criterion are those which may be critical/vital/important to assure uniqueness of columns or column groups reaching a threshold (e.g., 100% unique). Indexes that contain the unique columns may not be considered as critical since the unique index is more restrictive. Such identification could occur at CREATE/DROP index time and stored in the catalog. For example, IX1 UNIQUE (C1, C2), IX2 UNIQUE (C2, C1, C3), IX3 UNIQUE (C3, C1, C2). For classification purposes, IX1 (C1, C2) has a threshold (e.g., minimum) column coverage for uniqueness. Indexes based on application usage may render the unique index as redundant, although the index may be defined as UNIQUE with INCLUDE columns (for the additional columns) to verify that the uniqueness threshold is met and the index can be marked as non-critical. In certain specific embodiments, dropping a unique index may then result in the index moving from a non-critical to critical status.

Indexes may be identified based on clustering. An index meeting/not-meeting the clustering factor may not be considered for the index maintenance impact action due to inserts using this index to determine the data page to insert the row. A clustering attribute can be obtained from the catalog. The clustering factor may be utilized to identify that an index with the same preceding columns and thus same clustering attributes can take precedence and thus the clustering index can be specified as non-critical. This index may subsequently become a candidate for the index maintenance impact action if another index provides clustering and is required for the application/job/task.

Indexes may be identified based on application usage. As part of an access path selection process (e.g., bind/prepare), indexes chosen for the access path may be marked in the catalog as critical (e.g., directly, via a real-time statistics asynchronous process) for each given structured query language (SQL). This may occur for (all) bind/rebind/prepares, and thus include (all) static and dynamic SQL. This information may be subsequently used in conjunction with a last used date (e.g., timestamp of when the particular index was last utilized/accessed according to a criteria) to determine the candidacy for the index maintenance impact action. Some databases track the last used date for each index in the catalog. The criteria for utilization may include being required for at least one of an access path or a foreign key relationship. Accordingly, the absence of any SQL that utilizes an index may result in that index becoming a (well-suited) candidate for the index maintenance impact action based on the application usage factor.

Indexes may be identified based on a user input (e.g., user-provided factor, manual exclusion/inclusion of non-critical status). An administrator/user can override the status to exclude or include an index. As such, aspects allow for scheduled windows when indexes are online/offline (e.g., be emptied/rebuilt based on a schedule which may be predetermined). Indexes required for uniqueness may be restricted from manually being configured to being a candidate for the index maintenance impact action unless another index covers the uniqueness constraint for those columns. For indexes that are determined to be non-critical after the evaluation processes described herein, the last time the index was used in an access path may be used as a trigger to update the status to non-critical. For example, if an index has not been used for one month (or a configurable date parameter), then the index can be marked/flagged as an index maintenance impact action candidate.

For utilization as the non-critical index subset, the subset of the set of indexes may be flagged (e.g., to serve as the indication as non-critical). The flagging feature may be configured to facilitate a selection operation. Generally, the flagging feature may include a flag, tag, annotation, or other identifier. In certain embodiments, the flagging feature may be used to call attention to, emphasize, prioritize, or accentuate a one or more indexes which may be deemed as unnecessary for regular database operations (e.g., on a daily basis). In certain embodiments, aspects of the disclosure relate to using the flagging feature to facilitate a selection operation. The selection operation may include identifying one or more non-critical indexes as targets for an index maintenance impact action.

At block 320, a determination is made to perform an index maintenance impact action related to maintenance of the subset of the set of indexes. In various embodiments, the determination can include whether to perform the index maintenance impact action, or a nature/type of index maintenance impact action. The subset of the set of index (e.g., those indexes identified as non-critical to the application/job/task) may be first, hidden from the query optimizer; second, selected as deferred (or asynchronous) insert candidates such that the application will not wait for the insert to complete for the subset of the set of indexes; third, have a set of input data (e.g., all input data) removed from the subset of the set of indexes (and keep only an index definition in the catalog); or fourth, drop (e.g., delete, remove, prevent from use) the subset of the set of indexes. Determination of the first, second, third, or fourth options may be made based on (expected) usage/performance data. The methodology described herein may progressively determine which of the option(s) to proceed with in a sequential manner until the (expected) usage/performance data is exceeded by a threshold usage/performance.

In embodiments, the determining operational step includes both a comparing operation and a computing operation at block 325. The comparing operation compares a set of profile usage data (e.g., metadata about indexes that are lesser-utilized, frequency of use over a temporal period such as once per quarter, processor utilization over the temporal period, memory utilization over the temporal period, bandwidth utilization over the temporal period) for the non-critical index subset (e.g., an average of indexes in the subset, various usage schedules, quarterly) with a set of threshold usage data (e.g., a level of frequency/processor/memory/bandwidth which is user-defined or machine-learned to be an efficiency benchmark). The computing operation computes that a profile value (e.g., last used timestamp for a noncritical index) of the set of profile usage data exceeds a threshold value (e.g., a number of days ago, 31 days) of the set of threshold usage data. For example, the comparing and the computing may trigger a determination that indexes not utilized (as described herein such as not being required for at least one of an access path or a foreign key relationship) within the past month are to be hidden, indexes not utilized within the past three months are to be selected for a deferred maintenance status, indexes not utilized within the past 6 months are to have input data removed, and indexes not utilized within the past 12 months are to be dropped. Such example is illustrative, other possibilities and combinations are considered.

At block 330, the index maintenance impact action is performed. The index maintenance impact action is performed on (e.g., in correspondence to) the subset of the set of indexes. Performing can include initiating, launching, executing, running, or carrying-out the index maintenance impact action. The index maintenance impact action can include at least one of the first option (hiding), second option (deferring to bypass synchronous maintenance), third option (removing/keeping a shell so as to save the index definition but emptying the set of input data), or fourth option (dropping) described herein in any combination/order to benefit particular configurations, object creations, data insertions, or query plan selections.

Method 300 concludes at block 399. Aspects of method 300 may provide performance or efficiency benefits with respect to index maintenance management. For example, aspects of method 300 may include positive impacts on resource usage (e.g., memory) or speed (e.g., processing) by using aspects described herein. Altogether, performance or efficiency benefits related to index maintenance management may occur (e.g., flexibility, responsiveness, productivity).

Figure 4:
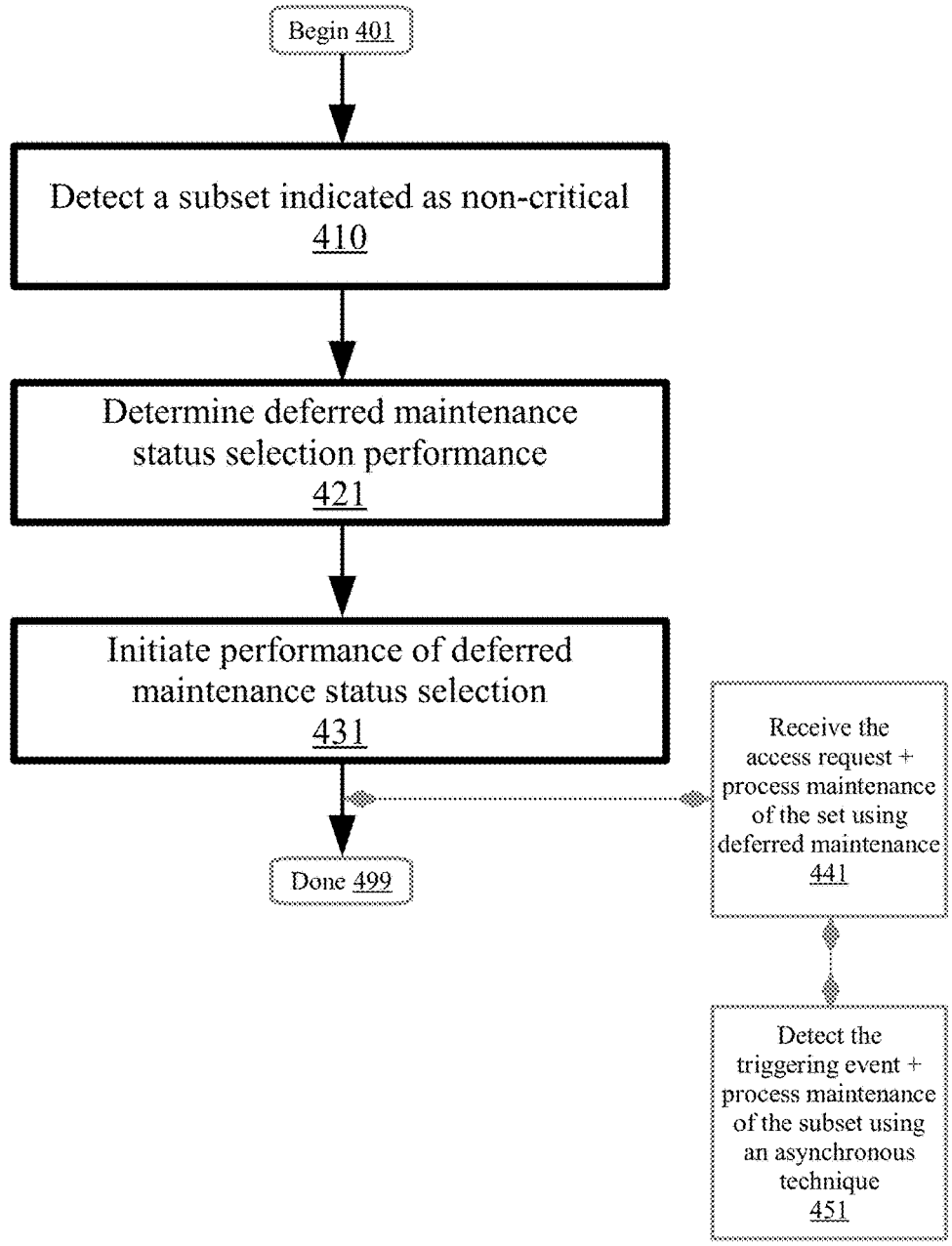
FIG. 4 is a flowchart illustrating a method for index maintenance management according to embodiments.

FIG. 4 is a flowchart illustrating a method 400 for index maintenance management of a relational database management system (RDBMS) according to embodiments. The relational database management system has a set of indexes with respect to a relational database table. Aspects of method 400 may be similar to or the same as method 300/500/600, and elements/features herein can be utilized interchangeably (e.g., with respect to the RDBMS). Method 400 may begin at block 401. At block 410, a subset of the set of indexes, which is indicated as a non-critical index subset, is detected with respect to the set of indexes.

The index maintenance impact action may include selecting a deferred maintenance status for the subset of the set of indexes to benefit resource usage associated with an access request to the relational database table. At block 421, a determination is made to perform the index maintenance impact action related to maintenance of the subset of the set of indexes. At block 431, the index maintenance impact action is performed. The index maintenance impact action is performed on (e.g., in correspondence to) the subset of the set of indexes. Selecting can include, for example, saving a data value (e.g., entering a digit/character in a data store), transmitting a data object (e.g., sending an object having metadata), routing a message (e.g., publishing a startup/wait expectation), or providing/performing/processing an operation (e.g., a notification). As a result of the selection, access requests which would otherwise change, modify, or update indexes (or the like) may be deferred, delayed, postponed, or in certain instances canceled/prevented. As such, resource usage with respect to computing capabilities such as processing, memory, or bandwidth may benefit (e.g., thereby providing positive impacts to query response performance such as when measured by time to establish/generate/implement one or more query plans).

In embodiments, maintenance of the set of indexes is processed at block 441. Such maintenance is processed using the deferred maintenance status to bypass (e.g., disregard, ignore, skip) synchronous maintenance of the subset of the set of indexes. Such maintenance may be processed in response to receiving the access request to the relational database table. In embodiments, a triggering event is detected at block 451 related to maintenance of the subset of the set of indexes. In response to detecting the triggering event, maintenance of the subset of the set of indexes using an asynchronous technique can be processed. The triggering event can include achieving (e.g., meeting, reaching, exceeding) a selection from a group consisting of at least one of: a threshold temporal period (e.g., a number of days), a threshold overflow page size (e.g., a number of bytes, a full page), or a threshold change log size (e.g., a number of entries, an aggregate storage size of entries).

For example, in response to a specific index being detected to be a deferred index candidate, then inserts to the specific index can be placed/saved to an overflow page or a change log (e.g., and not synchronously into the specific index). The overflow page may be similar to a header page (e.g., but different from a leaf page) such that it can require a small amount of resources (e.g., below a threshold) to find and no tree traversal may be required. In response to the overflow page reaching a threshold size (e.g., being full), then an asynchronous process can read the rows in the overflow page and perform an insert of rows (e.g., some rows, all rows) from the change log into the specific index. Other possibilities for the deferral operation are also contemplated.

Method 400 concludes at block 499. Aspects of method 400 may provide performance or efficiency benefits with respect to index maintenance management. For example, aspects of method 400 may include positive impacts on resource usage (e.g., memory) or speed (e.g., processing) by using aspects described herein. Altogether, performance or efficiency benefits related to index maintenance management may occur (e.g., flexibility, responsiveness, productivity).

Figure 5:
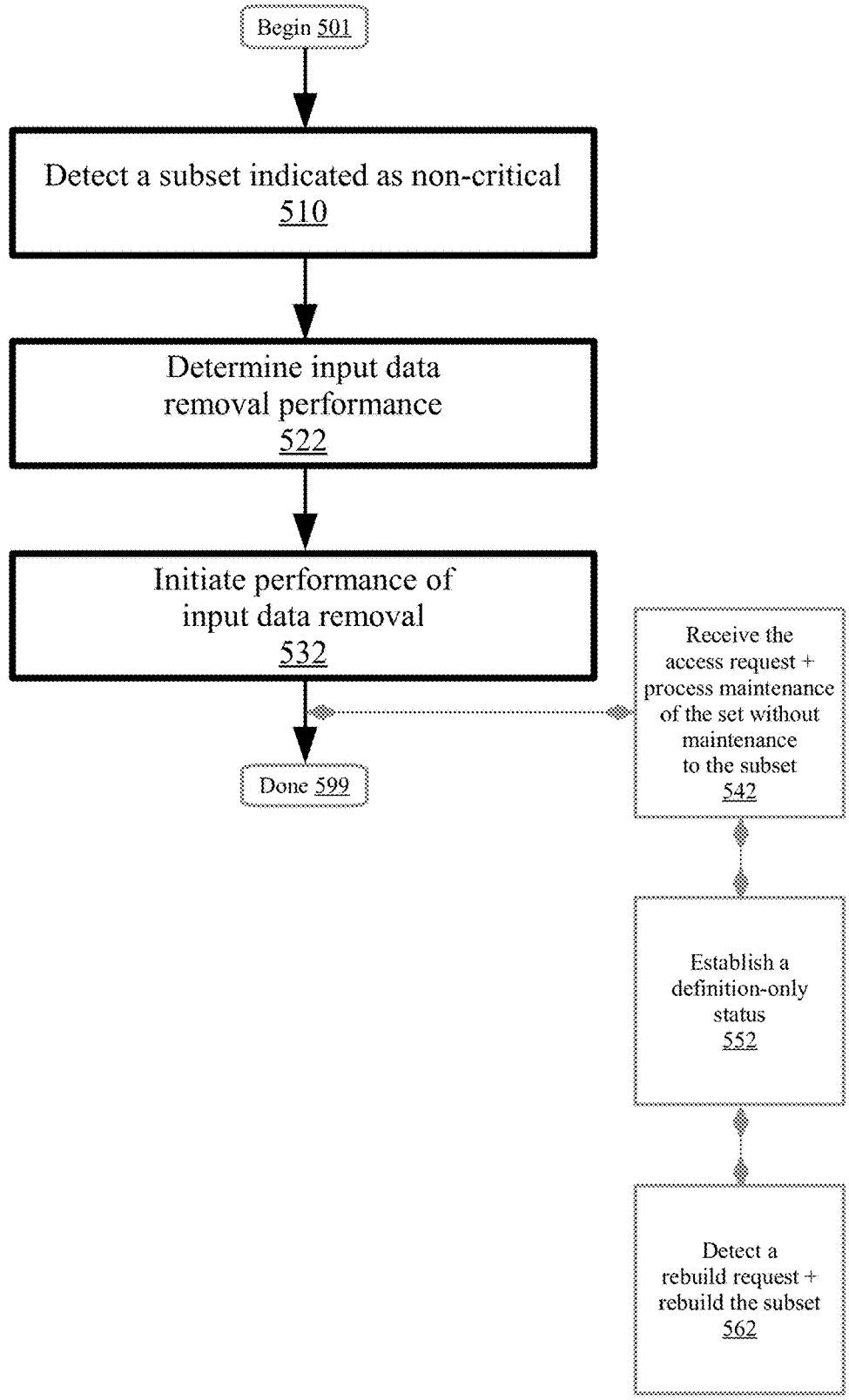
FIG. 5 is a flowchart illustrating a method for index maintenance management according to embodiments.

FIG. 5 is a flowchart illustrating a method 500 for index maintenance management of a relational database management system (RDBMS) according to embodiments. The relational database management system has a set of indexes with respect to a relational database table. Aspects of method 500 may be similar to or the same as method 300/400/600, and elements/features herein can be utilized interchangeably (e.g., with respect to the RDBMS). Method 500 may begin at block 501. At block 510, a subset of the set of indexes, which is indicated as a non-critical index subset, is detected with respect to the set of indexes. The subset of the set of indexes may have a set of input data (e.g., data received for storage in the RDBMS, contents of rows, user-provided information, data received from an external source) and an index definition (e.g., specifications for fields which are to be indexed and how the RDBMS generates the index such as using a column order).

The index maintenance impact action may include removing the set of input data from the subset of the set of indexes to benefit resource usage associated with an access request to the relational database table. At block 522, a determination is made to perform the index maintenance impact action related to maintenance of the subset of the set of indexes. At block 532, the index maintenance impact action is performed. The index maintenance impact action is performed on (e.g., in correspondence to) the subset of the set of indexes. Removing can include deleting, eliminating, moving, or replacing the set of input data (e.g., to save memory space, to save processing activities in response to the access request). As a result of the removal of the set of input data, access requests which would otherwise change, modify, or update indexes (or the like) may be disregarded, bypassed, ignored, skipped, or entered with mere placeholders instead of actual data contents. As such, resource usage with respect to computing capabilities such as processing, memory, or bandwidth may benefit (e.g., thereby providing positive impacts to query response performance such as when measured by time to establish/generate/implement one or more query plans).

In embodiments, maintenance of the set of indexes is processed at block 542. Such maintenance is processed without maintenance to the subset of the set of indexes (e.g., maintaining only indexes not part of the subset). Such maintenance may be processed in response to receiving the access request to the relational database table. In embodiments, a definition-only status is established for the subset of the set of indexes (e.g., keeping a shell of indexes of the subset so as to save the index definitions but emptying the sets of input data) at block 552. In various embodiments, the definition-only status has the index definition for use to rebuild the subset of the set of indexes in response to a rebuild request. The definition-only status may facilitate future rebuilding of the subset as appropriate (e.g., without having to completely re-engineer the subset since the shell is stored-off). In certain embodiments, the index definition is stored in a catalog (e.g., located internal/external to the RDBMS). In various embodiments, establishing the definition-only status includes marking, highlighting, or flagging the subset of the set of indexes in the catalog. Such marking can indicate a maintenance restriction (e.g., indicated for an administrator/user to see for analysis or troubleshooting) associated with the access request (e.g., noting disallowance of maintenance to the specific index/subset) to the relational database table. In embodiments, a rebuild request is detected with respect to or from a query optimizer (e.g., the specific index/subset is asked-for or needed) at block 562. When the rebuild request occurs in response to removing the set of input data, the subset of the set of indexes to include the set of input data can be rebuilt using the index definition.

For example, all data may be removed from non-critical indexes such that only the index definition(s) remains for historical tracking. Such an index may not be subject to any inserts, updates, or deletes. Accordingly, the performance/space reduction is effectively the same as if the indexes did not exist. A benefit of keeping the index in this definition state, as opposed to simply dropping the index, is in circumstances when there as a potential that the index may be needed sometime in the future (e.g., due to functionality of an application that may be utilized in future, a recurring but infrequent application process).

Method 500 concludes at block 599. Aspects of method 500 may provide performance or efficiency benefits with respect to index maintenance management. For example, aspects of method 500 may include positive impacts on resource usage (e.g., memory) or speed (e.g., processing) by using aspects described herein. Altogether, performance or efficiency benefits related to index maintenance management may occur (e.g., flexibility, responsiveness, productivity).

Figure 6:
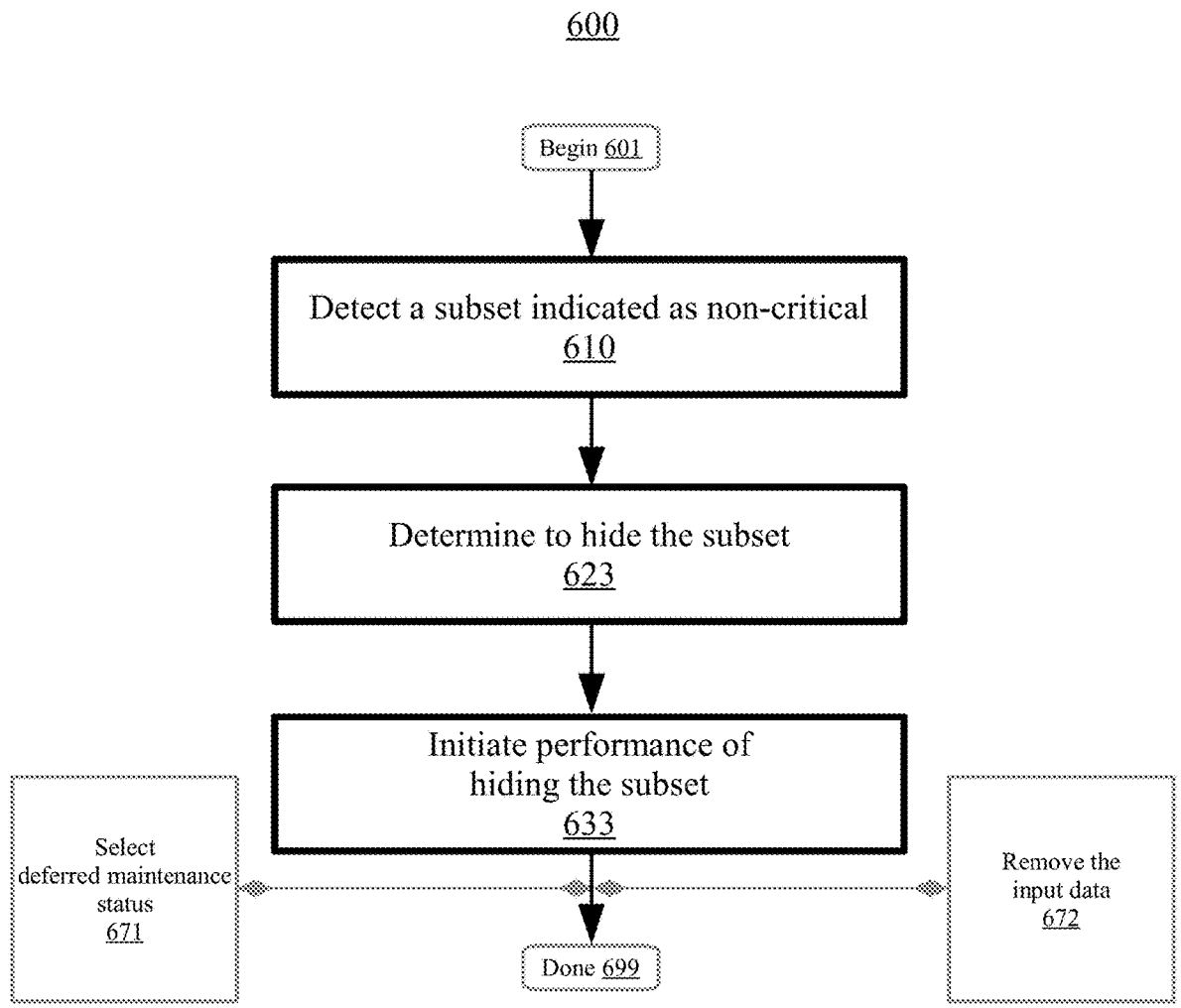
FIG. 6 is a flowchart illustrating a method for index maintenance management according to embodiments.

FIG. 6 is a flowchart illustrating a method 600 for index maintenance management of a relational database management system (RDBMS) according to embodiments. The relational database management system has a set of indexes with respect to a relational database table. Aspects of method 600 may be similar to or the same as method 300/400/500, and elements/features herein can be utilized interchangeably (e.g., with respect to the RDBMS). Method 600 may begin at block 601. At block 610, a subset of the set of indexes, which is indicated as a non-critical index subset, is detected with respect to the set of indexes. In embodiments, the subset of the set of indexes may have a set of input data (e.g., data received for storage in the RDBMS, contents of rows, user-provided information, data received from an external source) and an index definition (e.g., specifications for fields which are to be indexed and how the RDBMS generates the index such as using a column order).

The index maintenance impact action may include hiding, with respect to a query optimizer, the subset of the set of indexes to benefit resource usage associated with a query plan development operation. At block 623, a determination is made to perform the index maintenance impact action related to maintenance of the subset of the set of indexes. At block 633, the index maintenance impact action is performed. The index maintenance impact action is performed on (e.g., in correspondence to) the subset of the set of indexes. Hiding can include restricting from consideration, disregarding, preventing a presentation, or stopping/limiting an access request related to the subset of the set of indexes (e.g., to configure the query optimizer to disregard/bypass/ignore/skip the subset of the set of indexes when developing/generating/creating a query plan). As a result of the hiding, query plans may be developed without using computing resources to analyze/utilize the subset of the set of indexes. As such, resource usage with respect to computing capabilities such as processing, memory, or bandwidth may benefit (e.g., thereby providing positive impacts to query response performance such as when measured by time to establish/generate/implement one or more query plans).

In embodiments, the index maintenance impact action may include the selecting operation described herein (e.g., method 400) or the removing operation described herein (e.g., method 500). Accordingly, a deferred maintenance status can be selected for the subset of the set of indexes at block 671. Likewise, the set of input data may be removed from the subset of the set of indexes at block 672. Such operation(s) may be carried-out to benefit resource usage associated with an access request to the relational database table as described herein. Method 600 concludes at block 699 and may include the performance or efficiency benefits as described herein.

For example, moving an index to a hidden state may cause the query optimizer to disregard (e.g., ignore, not consider) the index (and associated statistics related to the index) for access path selection. Hidden indexes may be disregarded with respect to access path selection, and therefore there may be positive performance impacts to an access path selection operation due to a reduction in the number of indexes that the access path selection operation evaluates. In various embodiments, an external capability may be established for a user to control which indexes can be hidden. Also, statistics relevant to the index, such as multi-column cardinality, can be made available to the query optimizer regardless of whether the index is hidden. For instance, the statistics may be associated with the column group rather than the index in the catalog (e.g., to address utilization of the statistics). As described herein, hiding an index can be a precursor to deferring inserts for an index or removing the set of input data, or it may be implemented in conjunction with deferred maintenance/inserts or removing the set of input data.

In various embodiments, hidden indexes may be considered if the query optimizer cannot find a candidate index for the given query. Such a process may be considered when the query optimizer is left without another viable choice. An example may include a highly selective query where there is no supporting index. The lack of the supporting index itself may not a problem for queries that are expected to process a large number of rows; however, for transactional queries, the lack of the supporting index may result in challenges associated with performance.

In certain embodiments, the status of a hidden index can be automatically reset to active, or the RDBMS can track the number of times that a hidden index was considered by the query optimizer. In other embodiments, having the DBMS track and report when a query would have benefited from a hidden index may avoid the need for an automated switch. Reporting this arrangement may enable overcoming the situation from a configuration where there appears risk of a relational scan but the outer composite only qualifies zero or one row such that such a scan is not onerous. As described herein, a deferred insert index may be brought back to active status with lesser burdens compared with a definition-only index, since the definition only index may require a rebuild once a need for this index is determined. In various embodiments, a user may select to hide a challenging index for a given time period, for a specific SQL, or for a particular application to address configurations where a query optimizer mistakenly chooses the challenging index which is associated with adverse performance. As such, the user selection may be inclusive or exclusive such that the challenging index can be hidden for all SQL except those listed, or only hidden for those listed.

If a hidden index (that must be rebuilt/brought back online) is chosen as the lowest cost, then the access path selection process can synchronously set the hidden index back to online which may result in a deferred index synchronously being brought back to active. The query may be delayed until the index is completely back online. With respect to an automated process, then bringing an index back online may disable that index from again becoming a candidate for deferred inserts. A definition-only index may take longer to bring back online due to the index rebuild, and therefore, indexes may not be permitted to go into a definition-only status if an expectation exists that the index may be required frequently/soon. In certain embodiments, aspects may support the application returning an error message or choosing a less optimal index but a rebind/reprepare being issued once the index is back online. For static packages, in response to the package being loaded into an environmental descriptor manager (EDM) pool for execution, then the process described may be triggered.

A manual process can be provided to take an index offline with approximate day/time ranges such that an expectation exists that the index needs to come back online. The manual process may be beneficial for batch or month-end style processes. For such indexes, if the static package or a dynamic SQL is processed that is dependent on the index, then the SQL may delay until the index is back online, and the index can be moved back to a hidden status after the identified time period has passed.

As described herein, a same overflow page (change log) concept for the deferred insert index can be used for updates/deletes also. When inserting into the overflow page, rows can be appended with a timestamp, and 'action' of insert or delete. Updates would trigger two actions, a delete followed by an insert.

With respect to rollback and recoverability, rollback can be handled by first scanning the overflow page/area to mark any changes as not to be applied. For inflight transactions, such features may not be applied to the index and thus would only exist in the overflow area until commit, or such features may trigger a process to attempt to undo any changes applied to the index (e.g., a rollback operation). Indexes in a deferred state may be placed in a rebuild-pending state if rollback processing or some other process is unable to resolve the batched maintenance (e.g., inserts/deletes).

Index advisor tools may be utilized with aspects described herein. Such tools may have tracking capabilities configured/added such as the ability to override the database control of deferring or hiding indexes. The tools can enhance the usability of features for users. Such tools may provide information with respect to which indexes are candidates to take action based upon the implementation of aspects described herein in the RDBMS.

Hidden and deferred indexes may receive a lower priority for utility processing such as REORG, RUNSTATS, LOAD, REBUILD, RECOVER, etc. If such priority is designated, the index may remain in a hidden state such that automated switching to an active state can be restricted until the utility processing completes. Delaying processing of non-critical indexes may improve the response time for critical objects, allowing critical processing to continue sooner rather than waiting for all critical and non-critical objects to complete.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for index maintenance management of a relational database management system having a set of indexes with respect to a relational database table, the method comprising:

detecting, with respect to the set of indexes, a subset of the set of indexes which is indicated as a non-critical index subset;

determining, related to maintenance of the subset of the set of indexes, to perform an index maintenance impact action, wherein determining to perform the index maintenance action comprises:

determining a usage of the subset of the set of indexes is below a threshold usage over a threshold period of time;

selecting the index maintenance action based on the usage being below the threshold usage over a threshold period of time; and performing the index maintenance impact action to the subset of the set of indexes to create an updated set of indexes, wherein the index maintenance impact action includes selecting a deferred maintenance status for the subset of the set of indexes; and executing a query of the updated set of indexes.

2. The method of claim 1, wherein the index maintenance impact action includes benefitting resource usage associated with an access request to the relational database table.

3. The method of claim 2, further comprising:
receiving the access request to the relational database table; and
processing, in response to receiving the access request to the relational database table, maintenance of the set of indexes using the deferred maintenance status to bypass synchronous maintenance of the subset of the set of indexes.

4. The method of claim 3, further comprising:
detecting a triggering event related to maintenance of the subset of the set of indexes; and
processing, in response to detecting the triggering event, maintenance of the subset of the set of indexes using an asynchronous technique.

5. The method of claim 4, wherein the triggering event includes achieving a selection from a group consisting of at least one of: a threshold temporal period, a threshold overflow page size, or a threshold change log size.

6. The method of claim 1, wherein the subset of the set of indexes has a set of input data and an index definition, and wherein the index maintenance impact action further includes:
removing the set of input data from the subset of the set of indexes to benefit resource usage associated with an access request to the relational database table.

7. The method of claim 6, further comprising:
receiving the access request to the relational database table; and
processing, in response to receiving the access request to the relational database table, maintenance of the set of indexes without maintenance to the subset of the set of indexes.

8. The method of claim 7, further comprising:
establishing, for the subset of the set of indexes, a definition-only status.

9. The method of claim 8, wherein the definition-only status has the index definition for use to rebuild the subset of the set of indexes in response to a rebuild request, and wherein the index definition is stored in a catalog.

10. The method of claim 9, wherein establishing the definition-only status includes:
marking, in the catalog, the subset of the set of indexes to indicate a maintenance restriction associated with the access request to the relational database table.

11. The method of claim 8, further comprising:
detecting, with respect to a query optimizer, a rebuild request in response to removing the set of input data; and
rebuilding, using the index definition, the subset of the set of indexes to include the set of input data.

12. The method of claim 1, wherein the index maintenance impact action includes:
hiding, with respect to a query optimizer, the subset of the set of indexes to benefit resource usage associated with a query plan development operation.

13. The method of claim 1 further comprising:
selecting a deferred maintenance status for the subset of the set of indexes to benefit resource usage associated with an access request to the relational database table.

14. The method of claim 12, wherein the subset of the set of indexes has a set of input data and an index definition, and further comprising:
removing the set of input data from the subset of the set of indexes to benefit resource usage associated with an access request to the relational database table.

15. The method of claim 1, wherein detecting the subset of the set of indexes which is indicated as the non-critical index subset includes:
identifying, to benefit resource usage, the subset of the set of indexes based on a selection from a group consisting of at least one of: a uniqueness factor, a clustering factor, an application usage factor, or a user-provided factor; and
flagging, for utilization as the non-critical index subset, the subset of the set of indexes.

16. The method of claim 1, wherein determining to perform the index maintenance impact action includes:
comparing a set of profile usage data for the non-critical index subset with a set of threshold usage data; and
computing that a profile value of the set of profile usage data exceeds a threshold value of the set of threshold usage data.

17. The method of claim 1, wherein the detecting, the determining, and the performing each occur in an automated fashion without user intervention.

18. A system for index maintenance management of a relational database management system having a set of indexes with respect to a relational database table, the system comprising:
a memory having a set of computer readable computer instructions, and a processor for executing the set of computer readable instructions, the set of computer readable instructions including:
detecting, with respect to the set of indexes, a subset of the set of indexes which is indicated as a non-critical index subset;
determining, related to maintenance of the subset of the set of indexes, to perform an index maintenance impact action, wherein determining to perform the index maintenance action comprises:
determining a usage of the subset of the set of indexes is below a threshold usage over a threshold period of time;
selecting the index maintenance action based on the usage being below the threshold usage over a threshold period of time; and
performing the index maintenance impact action to the subset of the set of indexes to create an updated set of indexes, wherein the index maintenance impact action includes selecting a deferred maintenance status for the subset of the set of indexes; and
executing a query of the updated set of indexes.

19. A computer program product for index maintenance management of a relational database management system having a set of indexes with respect to a relational database table, the computer program product comprising a computer readable storage medium having program instructions embodied therewith, wherein the computer readable storage medium is not a transitory signal per se, the program instructions executable by a processor to cause the processor to perform a method comprising:
detecting, with respect to the set of indexes, a subset of the set of indexes which is indicated as a non-critical index subset;
determining, related to maintenance of the subset of the set of indexes, to perform an index maintenance impact action, wherein determining to perform the index maintenance action comprises:

determining a usage of the subset of the set of indexes is below a threshold usage over a threshold period of time;

selecting the index maintenance action based on the usage being below the threshold usage over a threshold period of time; and performing the index maintenance impact action to the subset of the set of indexes to create an updated set of indexes, wherein the index maintenance impact action includes selecting a deferred maintenance status for the subset of the set of indexes; and executing a query of the updated set of indexes.

20. The computer program product of claim 19, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to a remote data processing system for use in a computer readable storage medium with the remote data processing system.

* * * * *